United States Patent [19]

Wang et al.

[11] Patent Number: 5,276,772
[45] Date of Patent: Jan. 4, 1994

[54] REAL TIME ADAPTIVE PROBABILISTIC NEURAL NETWORK SYSTEM AND METHOD FOR DATA SORTING

[75] Inventors: C. David Wang, Melville; James Thompson, Greenlawn, both of N.Y.

[73] Assignee: AIL Systems, Inc., Deer Park, N.Y.

[21] Appl. No.: 648,194

[22] Filed: Jan. 31, 1991

[51] Int. Cl.$^5$ ............................................. G06F 15/18
[52] U.S. Cl. ....................................... 395/27; 395/24; 395/11
[58] Field of Search ....................... 395/27, 21, 22, 23, 395/24; 364/517; 342/197

[56] References Cited

U.S. PATENT DOCUMENTS

| | | | |
|---|---|---|---|
| 3,646,588 | 2/1972 | Van Popta | 343/7.3 |
| 3,653,042 | 3/1972 | Molho | 343/5 DP |
| 4,760,604 | 7/1988 | Cooper et al. | 382/15 |
| 4,851,854 | 7/1989 | Dorogin | 342/417 |
| 5,167,006 | 11/1992 | Furuta et al. | 395/11 |
| 5,175,798 | 12/1992 | Taylor et al. | 395/27 |

OTHER PUBLICATIONS

Roth, M. W., "Survey of Neural Network Technology for Automatic Target Recognition", IEEE Trans. on Neural Networks, Mar. 1990, 28–43.
Specht, D. F., "Probabilistic Neural Network, and the Polynomial Adaline as Complementary Techniques for Classification", IEEE Trans. on Neural Networks, Mar. 1990, 111–121.
Article: Probabilistic Neural Networks For Classification, Mapping or Associative Memory, published in the Proceedings of the 1988 IEEE International Conference On Neural Networks, vol. 1, pp. 525–532, Jul., 1988.
Article: The Use Of Probabilistic Neural Networks To Improve Solution Times For Hull–To–Emitter Correlation Problems, published by the International Joint Conference on Neural Networks, vol. 1, pp. 289–294, Jun., 1989, by Susie Maloney and Donald F. Specht.
Catalog: Performance By Paracom–The Power of Parallel Processing, undated, distributed by Paracom, Inc.
Article: An Application Of Neural Net Technology To Surveillance Information Correlation And Battle Outcome Prediction, by Susie Maloney, published by the IEEE, 1989.

*Primary Examiner*—Michael R. Fleming
*Assistant Examiner*—Robert W. Downs
*Attorney, Agent, or Firm*—Hoffmann & Baron

[57] ABSTRACT

An adaptive probabilistic neural network (APNN) includes a cluster processor circuit which generates a signal which represents a probability density function estimation value which is used to sort input pulse parameter data signals based upon a probability of obtaining a correct match with a group of input pulse parameter data signals that have already been sorted. In the APNN system, a pulse buffer memory circuit is contained within the cluster processor circuit and temporarily stores the assigned input pulse parameter data signals. The pulse buffer memory circuit is initially empty. As the input pulse parameter data signals are presented to the APNN, the system sorts the incoming data signals based on the probability density function estimation value signal generated by each currently operating cluster processor circuit. The current input pulse parameter data signal is sorted and stored in the pulse buffer memory circuit of the cluster processor circuit. A small probability density function estimation value signal indicates the current unassigned input pulse parameter data signal is not recognized by the APNN system. A large probability density function estimation value signal indicates a match and the current input pulse parameter data signal will be included within a particular cluster processor circuit.

6 Claims, 5 Drawing Sheets

REAL TIME ADAPTIVE PROBABILISTIC NEURAL NETWORK SYSTEM AND METHOD FOR DATA SORTING

BACKGROUND OF THE INVENTION

1. Field of the Invention

This invention relates to probabilistic neural networks, and more particularly relates to an adaptive probabilistic neural network that can sort digitized input pulse parameter data signal description words without the use of a priori training data.

2. Description of the Prior Art

Radar emitter pulse sorting and radar emitter identification are the primary functions of electronic support measure (ESM) and electronic counter measure (ECM) systems. There are three basic steps involved in the emitter identification process. First, the input pulse signals undergo an initial level of analysis and differentiation commonly referred to as "sorting" or "pulse-by-pulse deinterleaving". The sorting process involves analysis of the input signals to achieve an initial grouping of pulses from each emitter in the collected pulse sequence. If a high percentage of pulses are correctly sorted and grouped during the first sorting level, then only a small number of pulses will undergo a second level of deinterleaving. However, invariably many input pulse signals are not capable of being correctly sorted because the signals can not be easily differentiated by the system. The sorting system is not able to recognize the input signals because the input signals are often noisy, inaccurate and corrupt with additional or missing signal parameter components or information. The pulse groups which were not correctly sorted and grouped by the system at the first level of analysis require a second level of analysis commonly referred to as "second level deinterleaving". This second processing and sorting level requires multiple and complex sorting algorithms which occupy a great deal of computer time. Once all of the input signals have been sorted and deinterleaved by the first and second levels of analysis, they are transferred to a third stage of processing commonly referred to as emitter identification. During this stage, the sorted groups are analyzed so that the radar emitter transmitting each type of signal can be identified for ESM and ECM purposes.

In the past, various rule-based techniques were developed for sorting digitized pulse signals. One of the earlier rule-based sorting systems is commonly referred to as the histogram method. The histogram method compares each input pulse parameter signal against a group of preset signal parameters. The comparison is performed to determine if the parameters of the input pulse parameter signal can be classified within the group of preset signal parameter values. However, the histogram method may not accurately sort the incoming signal when even one parameter of the input pulse parameter signal does not match the preset signal parameter values. This makes the histogram method undesirable. The histogram method is also undesirable because the incoming signals must be input to the system at a relatively slow rate as compared to the rate that the pulse signals are transmitted by the radar emitter. Therefore, a sorting system utilizing the histogram method is not readily able to produce a real time system response to incoming radar pulse signals.

Another early rule-based sorting technique is commonly referred to as "adaptive binning." Adaptive binning compares individual parameters of the input pulse signal to preset signal parameter values. Each input pulse signal can have numerous parameter values. The adaptive binning system is relatively slow in operating because only one parameter comparison is undertaken at a time. Therefore, successive comparisons are not made until preceeding comparisons are complete.

Additionally, the adaptive binning system is very rigid, inflexible and incapable of sorting input signals having parameter value errors. For example, if an input pulse signal consists of ten parameters, and one parameter of the group of ten parameters is out of range because the signal is noisy and incapable of being properly read by the system, the input pulse signal would not be correctly sorted. This type of incorrect sorting can occur even if the remaining nine signal parameters match the corresponding preset signal parameter values exactly. Since the system is so inflexible and incapable of sorting inputs having only one corrupt input pulse parameter, optimal results for sorting real data only approach approximately 88% accuracy. The adaptive binning system is also undesirable because it can not easily provide a "joint" quality measurement of system performance and sorting accuracy.

It has been proposed by Donald F. Specht, in his article, "Probabalistic Neural Networks for Classification, Mapping, or Associative Memory", published in the Proceedings of the 1988 IEEE International Conference on Neural Networks, Vol. 1, pp. 525-32, July 1988, to use a probabilistic neural network (PNN) to recognize input signals based upon a priori test data. Specht proposed using a PNN to search incoming data signals for a priori data patterns. The a priori test data is essentially a library or directory of patterns representing a database for the system. The probabilistic neural network developed by Specht is a multi-layer feed-forward network which uses sums of Gaussian distributions to estimate a probability density function based upon a group of a priori training patterns. The estimated probability density function is then used to sort and match new input data to the a priori training patterns.

In another article, "The Use of Probabilistic Neural Networks to Improve Solution Times for Hull-To-Emitter Correlation Problems", published by the International Joint Conference on Neural Networks, Vol. 1, pp. 289-94, June 1989, P. Susie Maloney and Donald F. Specht disclose applying a probabilistic neural network to hull-to-emitter correlation problems for electronic intelligence (ELINT) systems. However, this process operates utilizing already sorted pulse data and does not use a probabilistic neural network for real time, non a priori pulse sorting. Real time, non a priori pulse sorting is difficult because real data input signals are often noisy, inaccurate, and corrupt with additional or missing signal parameter components and information. In addition, the output probability density function for a specific signal emitter may have multiple disjoint boundaries where an individual boundary may be overlapped with another emitter probability density function. Such input signal parameters cannot be accurately approximated by an n-dimensional Gaussion distribution as proposed by Specht.

OBJECTS AND SUMMARY OF THE INVENTION

It is an object of the present invention to provide a system and method to sort unknown and time varying radar signals containing pulse parameter data such as frequency, amplitude, pulse width and angle of arrival without the use of a priori training data.

It is another object of the present invention to provide a system and method to sort pulse parameter data signals at a rate faster than previously accomplished so as to achieve a real time system response.

It is yet another object of the present invention to provide a system and method that has better sorting accuracy than the previous rule-based sorting systems.

It is yet another object of the present invention to provide a system and method which produces both probability and reliability measures for sorting accuracy.

It is yet another object of the present invention to provide a system and method to reduce the amount of unsorted input pulse parameter data signals which would require a second level of sorting called second level deinterleaving.

It is yet another object of the present invention to provide a system and method to sort input radar signals having overlapping signal parameters and noisy or incomplete parameter data.

It is still another object of the present invention to provide a method to accomplish sorting by associating the input pulse parameter data to the cluster processor circuit with the largest corresponding probability density function estimation value signal.

It is yet a further object of the present invention to provide a pulse sorting system and method which overcomes the inherent disadvantages of known sorting techniques.

In accordance with one form of the present invention, a real time data sorting adaptive probabilistic neural network system includes at least one cluster processor circuit, a decision logic circuit and a switching circuit.

The cluster processor circuit includes a pulse buffer memory circuit essentially consisting of a group of serially connected memory circuits (i.e., registers). Input pulse parameter data signals which are provided to the system are temporarily stored in the serially connected memory circuits. The cluster processor circuit also includes a group of processing elements connected to the pulse buffer memory circuit, exponential function circuits coupled to corresponding processing elements and a summation circuit connected to each exponential function circuit. These components interact to generate a probability density function estimation value signal for the cluster processor circuit. The probability density function estimation value signal is generated by using both assigned input pulse parameter data signals temporarily stored in the memory circuits and current unassigned input pulse parameter data signals. The probability density function estimation value signal of a cluster processor circuit represents the probability that the current unassigned input pulse parameter data signal closely matches or belongs to the group of assigned input pulse parameter data signals currently stored in the corresponding cluster processor circuit.

The decision logic circuit is coupled to the summation circuit of each cluster processor circuit. The decision logic circuit compares the output signal of each summation circuit to at least a first threshold value signal, and more preferably, also to a second threshold value signal. The output signal of each summation circuit corresponds to a probability density function estimation value of the cluster processor circuit. The decision logic circuit comparison is made to determine if the probability density function estimation value signal is at least equal to the first threshold value signal, at most equal to the second threshold value signal, or less than the first threshold value signal and greater than the second threshold value signal. The comparison in the decision logic circuit occurs simultaneously for all currently operating cluster processor circuits. The sorting process can be characterized as an internal competition among the currently operating cluster processor circuits to determine which currently operating cluster processor circuit has the greatest probability density function estimation value signal and which assigned input pulse parameter data signal stored in the respective cluster processor circuit best matches the current unassigned input pulse parameter data signal.

The decision logic circuit is coupled to the switching circuit. The decision logic circuit generates and provides a decision address signal to the switching circuit. The decision address signal corresponds to the cluster processor circuit currently storing assigned input pulse parameter data signals that best match the current unassigned input pulse parameter data signal (i.e., the cluster processor circuit having the highest probability density function estimation value signal). If the probability density function estimation value signal of all currently operating cluster processor circuits is less than the first threshold value signal and less than the second threshold value signal, then the decision logic circuit provides a decision address signal to the switching circuit instructing the switching circuit to activate a previously non-operating cluster processor circuit.

The switching circuit receives both the decision address signal and the current unassigned input pulse parameter data signal being scrutinized. The switching circuit then provides the current unassigned input pulse parameter data signal to the pulse buffer memory circuit of the cluster processor circuit corresponding to the decision address signal transmitted by the decision logic circuit. The newly assigned input pulse parameter data signal is temporarily stored in the first register of the pulse buffer memory circuit of the corresponding cluster processor circuit. When the current input pulse parameter data signal is sorted and stored in the pulse buffer memory circuit, the previously stored input pulse parameter data signals are sequentially transmitted to the next register in the group of serially connected registers for further storage. Therefore, upon introduction of the current input pulse parameter data signal to the first register, the assigned input pulse parameter data signal that was previously stored in the first register is shifted to the second register of the pulse buffer memory circuit. Furthermore, the input pulse parameter data signal stored in the second register is shifted to the third register and so on. The input pulse parameter data signal that was in the last register of the pulse buffer memory circuit is considered "outdated" and not valuable for determining the next probability density function estimation value signal. Accordingly, this "outdated" input pulse parameter data signal is discarded and replaced by a subsequent input pulse parameter data signal.

The switching circuit will activate a previously non-operating cluster processor circuit when the probability density function estimation value signal computed for all currently operating cluster processor circuits is less than the first and the second threshold value signals. For example, a probability density function estimation value signal of less than 10% for every currently operating cluster processor circuit indicates that the current unassigned input pulse parameter data signal does not match the assigned input pulse parameter data signals stored in the currently operating cluster processor circuits. Accordingly, a previously non-operating cluster processor circuit is activated to store the current unassigned input pulse parameter data signal. The new cluster processor circuit corresponds to a new sorting group. The newly assigned input pulse parameter data signal will be stored in the first register of the pulse buffer of the newly activated cluster processor circuit.

A preferred form of the real time adaptive probabalistic neural network system and method for data sorting and storing, as well as other embodiments, objects, features and advantages of this invention, will be apparent from the following detailed description of illustrative embodiments thereof, which is to be read in connection with the accompanying drawings.

DETAILED DESCRIPTION OF THE PREFERRED EMBODIMENTS

Figure 1:
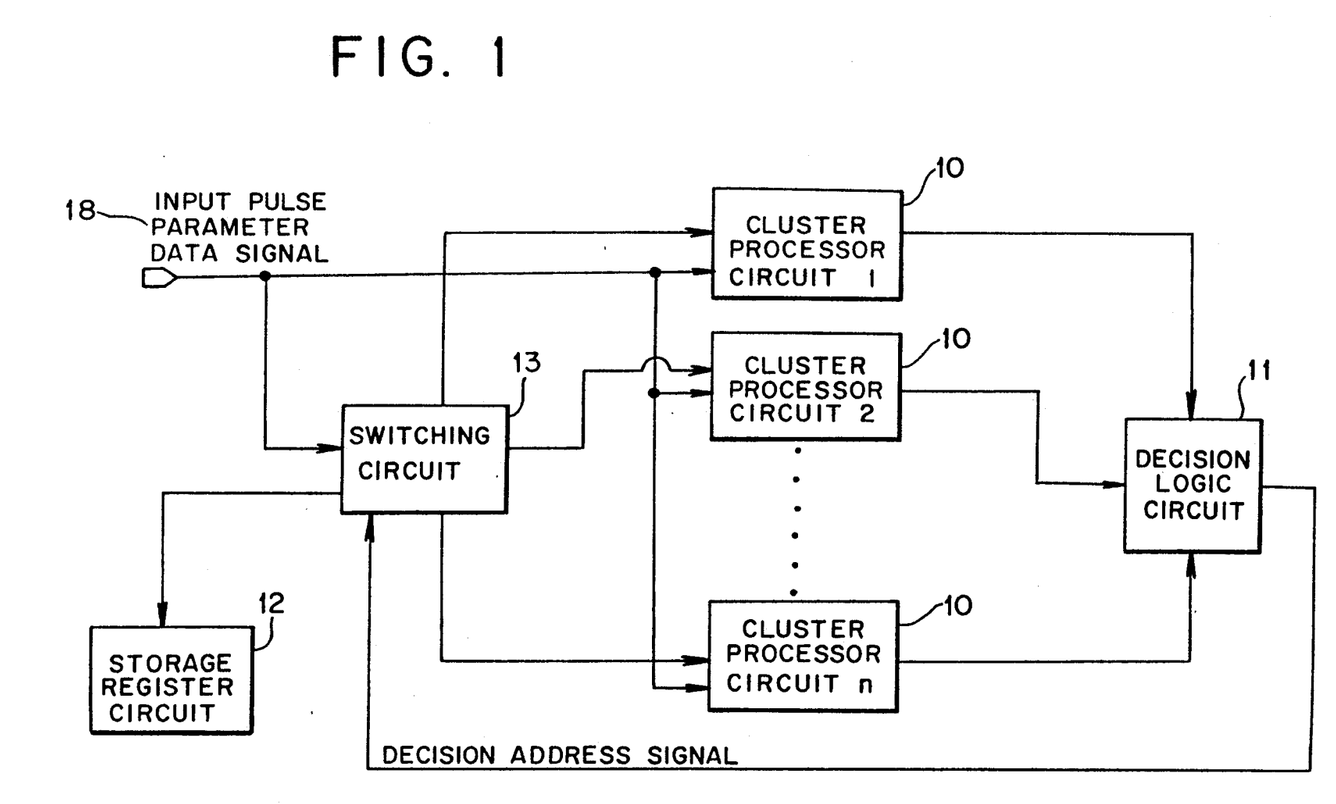
FIG. 1 is a block diagram of an adaptive probabilistic neural network system formed in accordance with the present invention.

Referring now to FIG. 1 of the drawings, a preferred real time data sorting adaptive probabilistic neural network (APNN) constructed in accordance with the present invention will now be described. The APNN includes a plurality of identical subunits commonly referred to as cluster processor circuits 10. Each cluster processor circuit may be classified as a currently operating cluster processor circuit, a newly operating cluster processor circuit or a non-operating cluster processor circuit. Each cluster processor circuit is operatively coupled to a decision logic circuit 11 and to a switching circuit 13. Each currently operating cluster processor circuit generates and provides a probability density function estimation value signal to the decision logic circuit. The decision logic circuit is also coupled to the switching circuit. The decision logic circuit generates and provides a decision address signal to the switching circuit. The decision address signal identifies the cluster processor circuit which results in correct sorting and temporary storage of the current unassigned input pulse parameter data signal 18.

Figure 2:
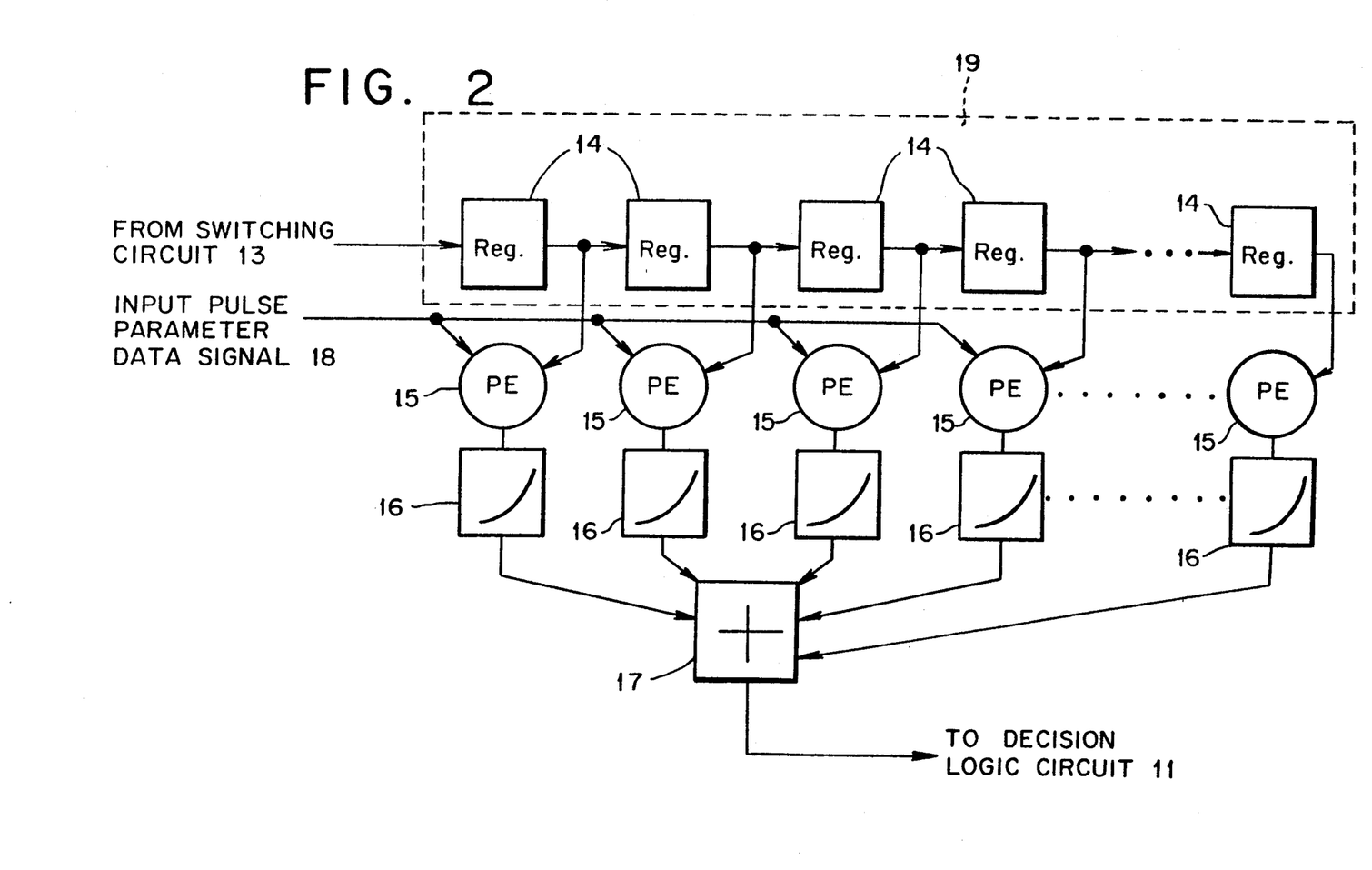
FIG. 2 is a block diagram of one cluster processor used in the neural network shown in FIG. 1.

A preferred form of the cluster processor circuit 10 is illustrated by FIG. 2. The cluster processor circuit includes a plurality of serially connected registers 14 (i.e., buffer memory circuits). The serially connected registers store the input pulse parameter data signal 18 assigned to the respective cluster processor circuit by the switching circuit 13. The combination of serially connected registers within the cluster processor circuit defines a pulse buffer memory circuit 19.

Each cluster processor circuit 10 also includes a plurality of processing elements 15. Each of the plurality of processing elements is coupled to a corresponding register 14 of the pulse buffer memory circuit 19. Each processing element receives assigned input pulse parameter data signals stored in a respective register of the pulse buffer memory circuit of the cluster processor circuit. Each processing element is also coupled to the system input which allows each processing element to receive the current unassigned input pulse parameter data signal 18. As described below, a processing element is designed to generate and transmit a signal to an exponential function circuit 16.

The cluster processor circuit 10 also includes a plurality of exponential function circuits 16. Each of the plurality of exponential function circuits is coupled to a corresponding processing element 15. Each exponential function circuit is configured to receive the output signal of only one of the plurality of processing elements. Each exponential function circuit performs an exponential function on the output signal of the processing element.

The cluster processor circuit 10 also includes a summation circuit 17. The summation circuit is coupled to each of the plurality of exponential function circuits 16 of the respective cluster processor circuit. The output signal of each exponential function circuit is received by the summation circuit. The summation circuit processes the exponential function circuit output signals of the corresponding cluster processor circuit. The output signal of the summation circuit also represents the output signal of the corresponding cluster processor circuit. The output signal of the cluster processor circuit corresponds to a probability density function estimation value of the cluster processor circuit. A probability density function estimation value is simultaneously calculated for all currently operating cluster processor circuits. A probability density function estimation value signal represents the probability that the current unassigned input pulse parameter data signal matches or belongs to the group of assigned input pulse parameter data signals currently stored in the registers 14 of the pulse buffer memory circuit 19 of the respective cluster processor circuit.

The cluster processor circuits 10 of the neural network system may employ parrallel processing using transputers. A suitable transputer which may be used is Part No. MTM-PC, which is a reconfigurable multi-transputer, manufactured by Inmos Corporation.

The decision logic circuit 11 is coupled to the summation circuit 17 of each cluster processor circuit 10. The decision logic circuit includes a plurality of comparators. The decision logic circuit is designed to compare the probability density function estimation value signal of each currently operating cluster processor circuit to at least a first threshold value signal. The comparison process occurs simultaneously for all currently operating cluster processor circuits. In response to this comparison, a decision address signal is generated and transmitted by the decision logic circuit to the switching circuit 13. The decision address signal represents the cluster processor circuit currently storing the assigned input pulse parameter data signals which best match the current unassigned input pulse parameter data signal. The decision address signal can correspond to any currently operating cluster processor circuit or it can activate a non-operating cluster processor circuit so that the pulse buffer memory circuit 19 of the newly operating cluster processor circuit will store the current input pulse parameter data signal.

The switching circuit 13 is operatively coupled to the decision logic circuit 11 and to the pulse buffer memory circuit 19 of each cluster processor circuit. The switching circuit also receives the current unassigned input pulse parameter data signal 18. Upon receiving the decision address signal from the decision logic circuit, the switching circuit transmits the current unassigned input pulse parameter data signal to the pulse buffer memory circuit 19 of the cluster processor circuit 10 corresponding to the decision address signal received.

A storage register circuit 12 is coupled to the switching circuit 13. The storage register circuit receives the current unassigned input pulse parameter data signal transferred by the switching circuit. The switching circuit transfers, to the storage register circuit, the input pulse parameter data signals which can not be properly sorted by the present sorting method. This assignment to the storage register circuit corresponds to a probability density function estimation value signal of the respective cluster processor circuit which is less than the first threshold value signal and greater than the second threshold value signal. The input pulse parameter data signal in the storage register is maintained for possible future analysis and processing. Therefore, the input pulse parameter data signal may be correctly sorted to one of the plurality of cluster processor circuits.

The operation of the real time adaptive probabilistic neural network (APNN) for data sorting, constructed in accordance with the present invention, will now be described. Initially, the registers 14 of the pulse buffer memory circuit 19 of each cluster processor circuit 10 are empty and contain no assigned input pulse parameter data signals. The APNN system is designed so that a priori training data does not have to be stored in the registers at the beginning of system operation in order to effectuate sorting. The APNN system operates to develop its own sorting groups as the current unassigned input pulse parameter data signals 18 are introduced to the system. The sorting groups are defined by an internal competition among cluster processor circuits 10. Each currently operating cluster processor circuit represents a different sorting group corresponding to a different type of input pulse parameter data signal received. If the calculated probability density function estimation value signal of each currently operating cluster processor is less than at least a first threshold value signal, then a match does not exist between the current unassigned input pulse parameter data signal and the assigned input pulse parameter data signal stored in each currently operating cluster processor circuit. Therefore, a previously non-operating cluster processor circuit will be activated to establish a newly operating cluster processor circuit for storing the current input pulse parameter data signal.

The input pulse parameter data signal 18 introduced to the APNN system can represent any collection of measured pulse data. In the preferred embodiment, the input pulse parameter data signal is represented by a series of pulse signal parameters X where

X=[FF, PA, PW, AOA]

and FF=fine frequency

PA=pulse amplitude
PW=pulse width
AOA=angle of arrival

For certain ESM systems, the AOA measurements are expressed by relative phases between three antennas to a reference antenna which itself corresponds to a vector of three components where:

AOA=[coarse AOA, fine AOA, extra-fine AOA]

Initially, when the system is activated, only a first cluster processor circuit of the plurality of cluster processor circuits is "currently operating." All other cluster processor circuits within the APNN system are "non-operating." The APNN system is initialized by receiving and providing the first input pulse parameter data signal 18 into the currently operating first cluster processor circuit. As the first input pulse parameter data signal is introduced to the APNN system, it is provided to each processing element 15 of the currently operating first cluster processor circuit. A probability density function estimation value signal is then generated in the currently operating first cluster processor circuit by the combined effects of the processing elements, the exponential function circuits, and the summation circuit. The probability density function estimation value signal is outputted by the summation circuit of the currently operating first cluster processor circuit according to the first input pulse parameter data signal.

The probability density function estimation value signal is generated according to the formula:

where Pr=probability density function estimation value

X=the current input pulse parameter data

W=previous input pulse parameter which is currently stored in a register of the pulse buffer i=cluster processor number corresponding to the emitter group or bin number j=current input data pulse signal parameter being analyzed Sigma=smoothing factor which represents the standard deviation of the probability density function (a constant set by the system operator)

M=total number of parameters contained in the input data pulse (i.e., FF, PA, PW . . . )

EXP=the exponential function

The probability density function estimation value signal is generated by the currently operating first cluster processor circuit in the following manner. The current unassigned input pulse parameter data signal to be sorted is received and provided to each processing element 15 of the first cluster processor circuit. Each processing element determines a value for the expression:

The above expression correlates to subtracting each parameter of the assigned input pulse parameter data signals stored in the registers 14 of the pulse buffer memory circuit 19 from the current unassigned input pulse parameter data signal. Since the current unassigned input pulse parameter data signal is the first data signal provided to the APNN system, there are no signals stored in the serially connected registers of the pulse buffer memory circuit. To account for the lack of stored data in the pulse buffer memory circuit, logic zeros are transmitted from each serially connected register to each processing element so that a value for the above expression can be generated. The difference between the input pulse parameter data signals stored in the registers (here it is logic zero) and the current unassigned input pulse parameter data signal is then squared and divided by Sigma$^2$, where Sigma has a constant value. The resulting value is provided to the exponential function circuit 16. The exponential function circuit performs an exponential function and generates a signal which is provided to the summation circuit 17.

The summation circuit 17 adds all of the output signals of the exponential function circuits 16. The output signal of the summation circuit, which corresponds to the output signal of the cluster processor circuit 10, is a measure of the probability or likelihood that the current unassigned input pulse parameter data signal matches the assigned input pulse parameter data signal stored in the pulse buffer memory circuit of the respective cluster processor circuit. For example, a probability density function estimation value signal of 80% represents a high probability of correctly sorting the current unassigned input pulse parameter data signal if the current unassigned input pulse parameter data signal is stored in the respective cluster processor circuit. However, a probability density function estimation value signal of 10% represents a decisive mismatch for the current unassigned input pulse parameter data signal and the assigned input pulse parameter data signal stored in the respective cluster processor circuit.

The decision logic circuit 11 contains at least a first threshold value signal. The decision logic circuit receives and compares the probability density function estimation value signal of the currently operating first cluster processor circuit to at least the first threshold value signal. The decision logic circuit comparison determines whether the current unassigned input pulse parameter data signal should be stored in the currently operating first cluster processor circuit or whether a non-operating cluster processor circuit should be activated to store the current unassigned input pulse parameter data signal. A newly operating cluster processor circuit represents a new sorting classification of input pulse parameter data signals received. In the preferred embodiment, two threshold value signals are utilized. They are the 70% and 10% threshold value signals. If it is assumed that the probability density function estimation value signal for the currently operating first cluster processor circuit is at least equal to the 70% threshold value signal, then the current unassigned input pulse parameter data signal will be stored in the currently operating first cluster processor circuit. Therefore, after comparing the probability density function estimation value signal of the currently operating first cluster processor circuit with the 70% and 10% threshold value signals, the decision logic circuit will generate and provide a decision address signal to the switching circuit 13 corresponding to the currently operating first cluster processor circuit. The decision address signal directs the switching circuit to transmit the current unassigned input pulse parameter data signal to the first register of the pulse buffer memory circuit 19 for temporary storage.

If the probability density function estimation value of the currently operating first cluster processor circuit is at most equal to the 10% threshold value signal, then a decision address signal will be transmitted instructing the switching circuit to activate a previously non-operating cluster processor circuit. The previously non-operating cluster processor circuit is now referred to as a newly operating cluster processor circuit. The switching circuit then transmits the current unassigned input pulse parameter data signal to the first register of the pulse buffer memory circuit of the newly operating cluster processor circuit for temporary storage. The activation of the newly operating cluster processor circuit corresponds to a new type of input pulse parameter data signal received by the APNN system.

If the probability density function estimation value signal generated by the currently operating first cluster processor circuit is greater than the 10% and less than the 70% threshold value signals, then a different decision address signal is transmitted by the decision logic circuit 11 to the switching circuit 13. This decision address signal instructs the switching circuit to assign the current unassigned input pulse parameter data signal to a storage register circuit 12 for temporary storage. The input pulse parameter data signal stored in the storage register circuit is saved so that the APNN system can analyze the stored input pulse parameter data signal in greater detail at a later time. The input pulse parameter data signal stored in the storage register circuit is not used in subsequent calculations of probability density function estimation value signals. If desired, this unassigned input pulse parameter data signal stored in the storage register circuit can undergo a second level of analysis called deinterleaving. After the data has been deinterleaved, it can be sorted and stored in any currently operating or newly operating cluster processor circuit.

Figure 3:
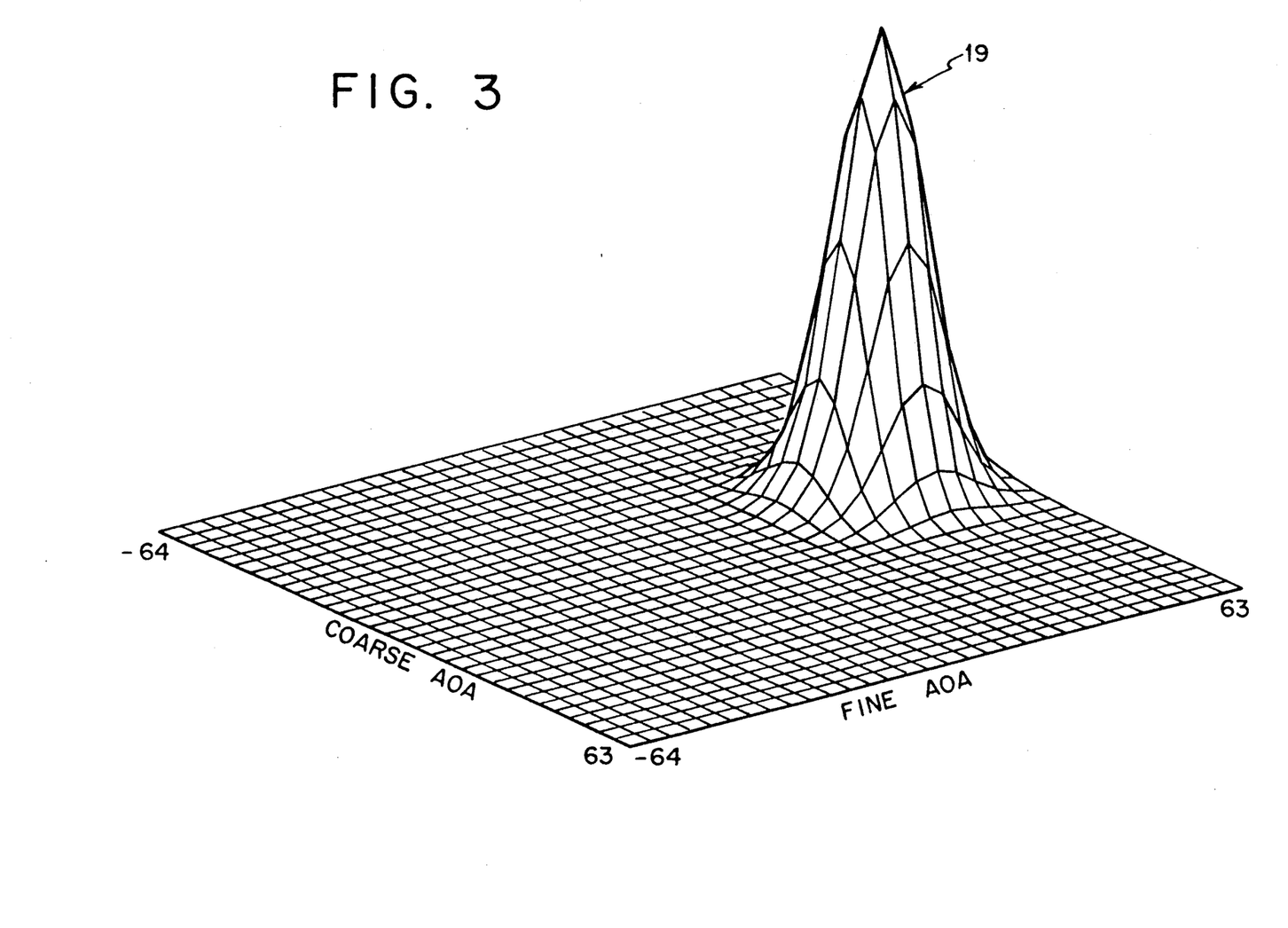
FIG. 3 is a graphical representation of a decision boundary of a 2-dimensional probabilistic neural network, formed in accordance with the present invention, after sorting one input pulse parameter data signal.

The probability density function estimation value signal graph for the first cluster processor circuit containing the first input pulse parameter data signal is shown in FIG. 3. The probability density function estimation is shown by a two variable, two dimensional graph of, for example, coarse AOA vs fine AOA, as shown by reference numeral 19. Similar graphs can be made having different coordinate axes corresponding to the types of parameters which represent the input pulse parameter data signal. From FIG. 3, it is possible to measure statistical properties and to determine sorting performance in a quantitative manner.

Figure 4:
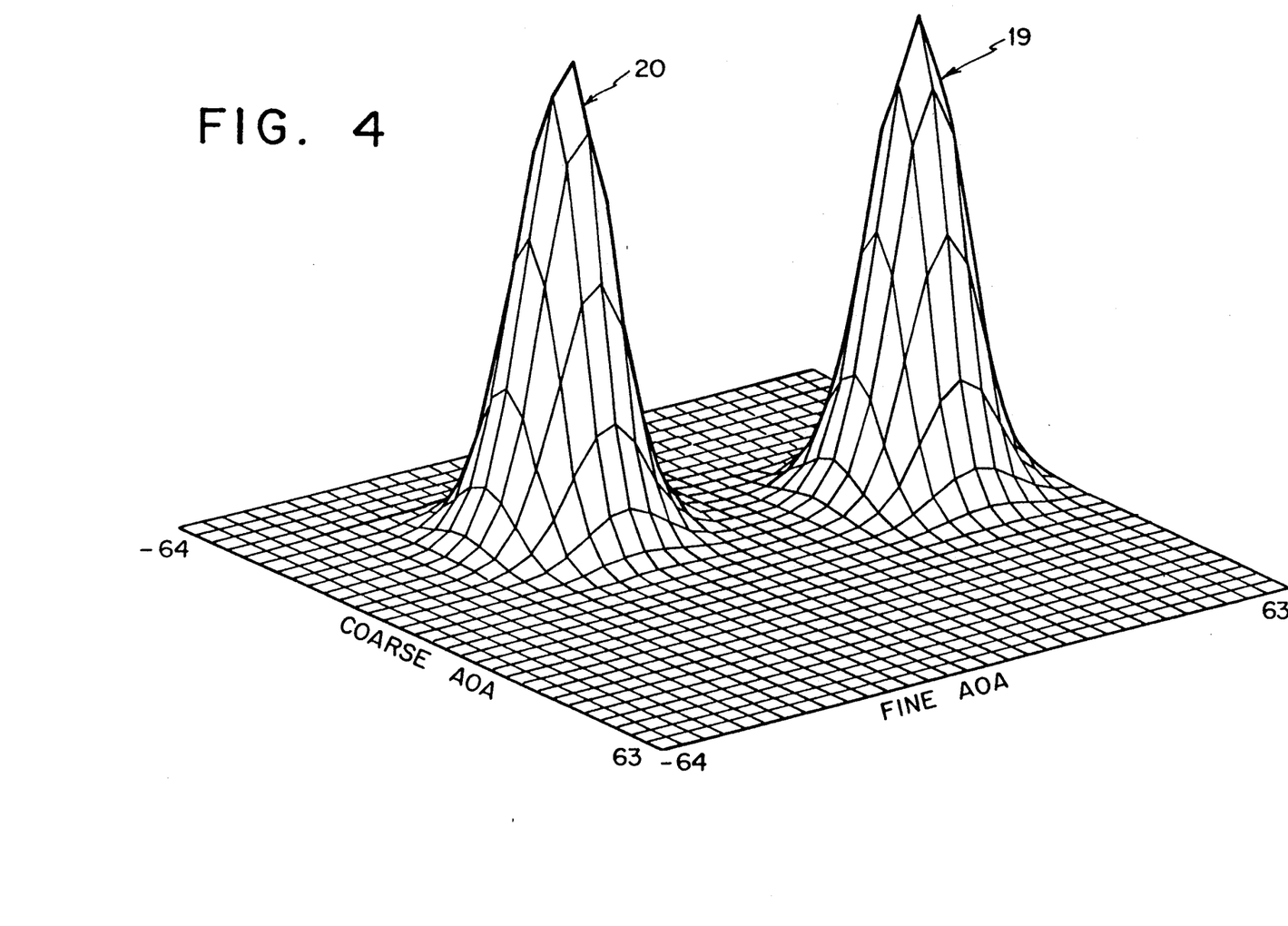
FIG. 4 is a graphical representation of a decision boundary of a 2-dimensional probabilistic neural network, formed in accordance with the present invention, after sorting two input pulse parameter data signals.

As a second unassigned input pulse parameter data signal (Pulse No. 2) enters the system, initialization is not needed because the system has been operating. Therefore, the current unassigned input pulse parameter data signal (Pulse No. 2) is provided to each processing element of the first cluster processor circuit. The previous input pulse parameter data signal (Pulse No. 1), which is stored in the first register of the pulse buffer memory circuit 19 of the currently operating first cluster processor circuit, is provided to the first processing element along with Pulse No. 2. All other registers of the first cluster processor circuit which do not contain data signals provide a logic zero to corresponding processing elements. Each processing element generates and provides a signal to the corresponding exponential function circuit 16. The summation circuit 17 transmits the output signal of the cluster processor circuit to the decision logic circuit 11. The decision logic circuit performs a series of comparisons to see whether the probability density function estimation value signal of the first currently operating cluster processor circuit corresponding to Pulse No. 2 is at least equal to the 70% threshold value signal, at most equal to the 10% threshold value signal, or greater than the 10% and less than the 70% threshold value signal. If it is assumed that the current unassigned input pulse parameter data signal (Pulse No. 2) has less than a 10% probability density function estimation value as determined by the currently operating first cluster processor circuit, then the decision logic circuit provides a decision address signal to the switching circuit 13 to activate a previously non-operating cluster processor circuit. This newly operating cluster processor circuit corresponds to a new classification of input pulse parameter data signals. The switching circuit then transmits the current unassigned input pulse parameter data signal (Pulse No. 2) to the first register of the pulse buffer memory circuit of the newly operating second cluster processor circuit. The current unassigned input pulse parameter data signal (Pulse No. 2) is now referred to as an assigned input pulse parameter data signal. The probability density function estimation value signal graph showing the first and second currently operating cluster processor circuits and the corresponding assigned input pulse parameter data signals is shown by reference numerals 19 and 20 in FIG. 4.

As the next current unassigned input pulse parameter data signal (Pulse No. 3) is received and introduced to the adaptive probabilistic neural network, signal generation by the two currently operating cluster processor circuits is performed concurrently (i.e., in parallel). This is a clear benefit to using the neural network system over previous pulse sorting systems that operated by a rule-base method. The present APNN parallel processing system allows for numerous computations in a shorter time period.

Assuming that the two currently operating cluster processor circuits compute a probability density function estimation value signal using Pulse No. 3, both probability density function estimation value signals are transmitted by the summation circuit of each currently operating cluster processor circuit to the decision logic circuit 11. Once again, the previously stated 10%-70% threshold value signal comparison occurs. However, if both currently operating cluster processor circuits have a probability density function estimation value signal of greater than 70%, then the decision logic circuit will output a decision address signal corresponding to the currently operating cluster processor circuit having the larger probability density function estimation value signal. Assuming that the probability density function estimation value signal of the first currently operating cluster processor is larger than the probability density function estimation value signal of the second currently operating cluster processor, and further assuming that both estimation value signals are greater than the 70% threshold value signal, then the decision logic circuit will provide a decision address signal to the switching circuit corresponding to the currently operating first cluster processor circuit. Therefore, the switching circuit 13 assigns the current unassigned input pulse parameter data signal (Pulse No. 3) to the first register of the pulse buffer memory circuit 19 of the currently operating first cluster processor circuit. Accordingly, the previously assigned input pulse parameter data signal (Pulse No. 1) that was stored in the first register of the pulse buffer memory circuit of the currently operating first cluster processor circuit is shifted to the second register of the pulse buffer memory circuit. For each new input pulse parameter data signal that is introduced to the pulse buffer memory circuit of the currently operating first cluster processor circuit, the assigned input pulse parameter data signal is shifted to the next register until the assigned input pulse parameter data signal reaches the end of the pulse buffer memory circuit. When the assigned input pulse parameter data signal reaches the end of the pulse buffer memory circuit, it is discarded.

Figure 5:
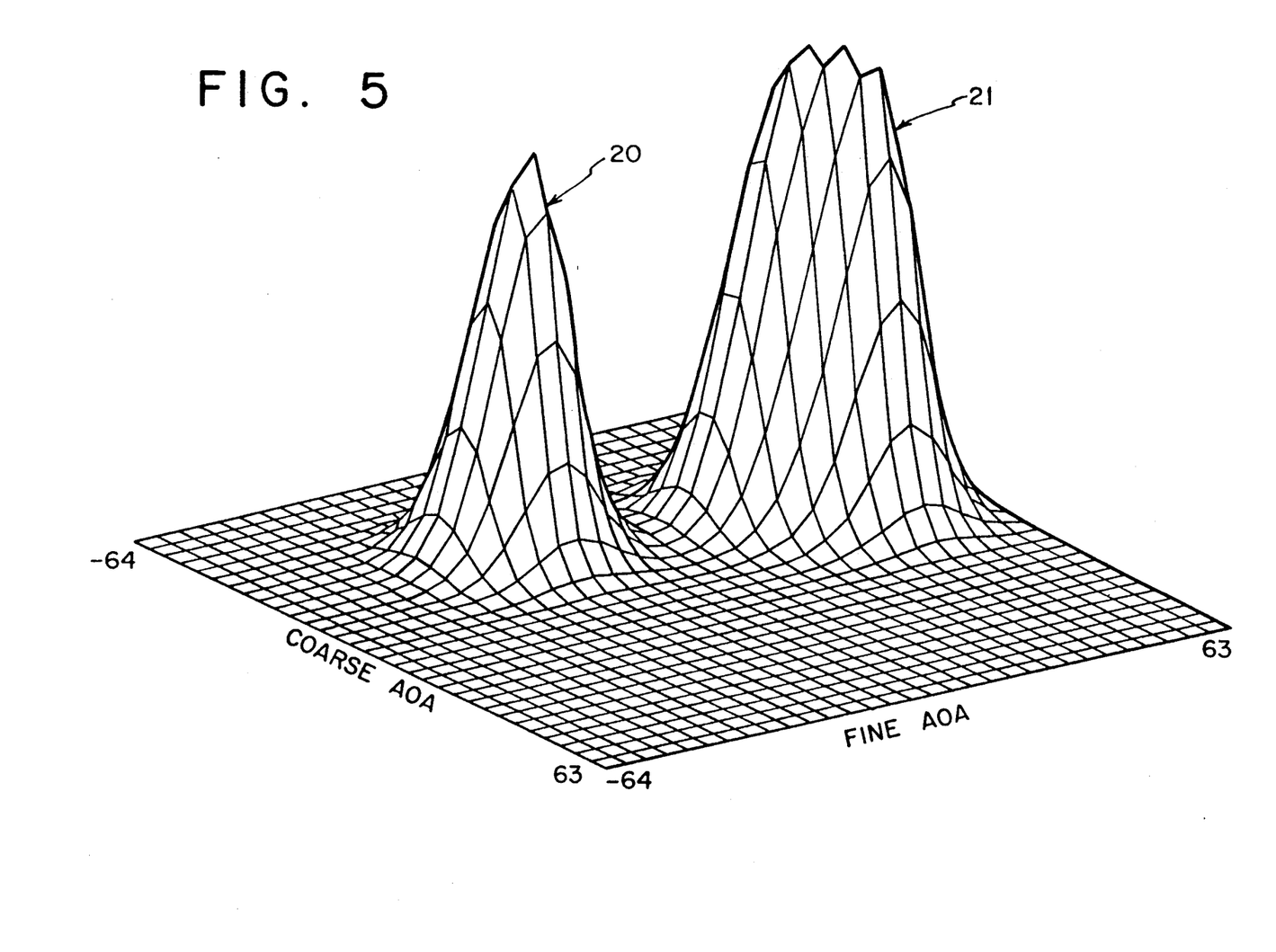
FIG. 5 is a graphical representation of a decision boundary of a 2-dimensional probabilistic neural network, formed in accordance with the present invention, after sorting three input pulse parameter data signals.

FIG. 5 shows the probability density function estimation for the two currently operating cluster processors after the APNN system has received three input pulse parameter data signals. Reference numeral 21 represents the probability density function estimation value generated by the currently operating first cluster processor having two input pulse parameter data signals sorted therein.

The real time adaptive probabilistic neural network of the present invention is advantageously designed so that sorting of pulses at pulse arrival rates of over 10 million/sec can be achieved based on current VLSI technology. This is possible because the APNN system generates output signals using parallel processing. Previously used sorting methods generated output signals sequentially. The faster parallel processing enables the current APNN system to achieve a real time response.

Since the sorting process is based on a joint probability of the entire input pulse parameter data signal matching the input pulse parameter data signals previously sorted and stored in each cluster processor circuit, the system is capable of producing approximate results from noisy and incomplete data. This yields increased sorting accuracy as compared with previous sorting systems.

The adaptive probabilistic neural network of the present invention is also advantageously designed to provide a measure of the amount of error that will be tolerated by the system. This corresponds to the threshold value signals which are set by the system operator (i.e., 10% and 70% threshold value signals). The threshold value signals can be selected as desired.

Although an illustrative embodiment of the present invention has been described herein with reference to the accompanying drawings, it is to be understood that the invention is not limited to the precise embodiment, and that various other changes and modifications may be effected therein by one skilled in the art without departing from the scope or spirit of the invention.

We claim:

1. A real time data sorting adaptive probabilistic neural network system comprising:
   (a) a plurality of cluster processor circuits, each cluster processor circuit generating an output signal representing a probability density function estimation value, each cluster processor circuit including:
   (1) a pulse buffer memory circuit, the pulse buffer memory circuit having a plurality of serially connected registers for storing input pulse parameter data signals assigned to a respective cluster processor circuit;
   (2) a plurality of processing elements, each of the processing elements being coupled to a corresponding register of the pulse buffer memory circuit for receiving assigned input pulse parameter data signals stored in the pulse buffer memory circuit, each of the processing elements further receiving current unassigned input pulse parameter data signals, each processing element providing an output signal;
   (3) a plurality of exponential function circuits, each of the exponential function circuits being coupled to a corresponding processing element, each exponential function circuit performing an exponential function on the output signal of each processing element and providing an output signal in response thereto; and (4) a summation circuit coupled to each of the exponential function circuits of the respective cluster processor circuit, the summation circuit receiving the output signals from the exponential function circuits and performing an addition function thereon and providing an output signal representing a probability density function estimating value;

(b) a decision logic circuit, the decision logic circuit being coupled to the summation circuit of each cluster processor circuit, the decision logic circuit comparing the output signal of each summation circuit of the corresponding cluster processor circuit with at least a first threshold value signal, and providing a decision address signal in response thereto, (c) a switching circuit, the switching circuit being coupled to the decision logic circuit and to each of the cluster processor circuits and further receiving current unassigned input pulse parameter data signals and assigning the current unassigned input pulse parameter data signals to a respective cluster processor circuit for storage in the pulse buffer memory circuit of the respective cluster processor circuit in response to the decision address signal from the decision logic circuit; and a storage register circuit, the storage register circuit being coupled to the switching circuit, the switching circuit providing the current unassigned input pulse parameter data signal to the storage register circuit when the output signal of the summation circuit of each cluster processor circuit is less than the threshold value signal and greater than a second threshold value signal.

2. A system as defined by claim 1, wherein the switching circuit is coupled to the pulse buffer memory circuit of each cluster processor circuit, the switching circuit assigning the current unassigned input pulse parameter data signal to the pulse buffer memory circuit of a currently operating cluster processor circuit if the summation circuit output signal representing a probability density function estimation value of the currently operating cluster processor circuit is at least equal to a first threshold value signal, and wherein the switching circuit assigns the current unassigned input pulse parameter data signal to the pulse buffer memory circuit of a newly operating cluster processor which was previously a non-operating cluster processor if the summation circuit output signal representing the probability density function estimation value of each currently operating cluster processor circuit is less than the first threshold value.

3. A method of sorting input pulse parameter data signals which comprises the steps of:

(a) inputting a current unassigned input pulse parameter data signal into at least one of a plurality of processing elements contained within a plurality of currently operating cluster processor circuits;

(b) generating a first signal representing a probability density function estimation value in response to the input pulse parameter data signals of each currently operating cluster processor circuit of the plurality of cluster processors, the probability density function estimation value signal being generated using the current unassigned input pulse parameter data signal and using a plurality of assigned input pulse parameter data signals stored in a pulse buffer memory circuit of each currently operating cluster processor circuit;

(c) comparing the first signal representing the probability density function estimation value generated by each currently operating cluster processor circuit to at least a first threshold value signal in a decision logic circuit;

(d) generating a decision address signal in response to the comparison of the first signal and the first threshold value signal, the decision address signal being provided to a switching circuit, the decision address signal denoting a currently operating cluster processor circuit when the first signal representing the probability density function estimation value is at least equal to the first threshold value signal, the decision address signal denoting and activating a non-operating cluster processor circuit when the first signal representing the probability density function estimation value is at most equal to the first threshold value signal;

(e) assigning the current unassigned input pulse parameter data signal from the switching circuit to the cluster processor circuit corresponding to the decision address signal provided to the switching circuit; and (f) storing the current unassigned input pulse parameter data signal in the pulse buffer memory circuit of the cluster processor circuit according to the decision address signal received by the switching circuit.

4. A method as defined by claim 3, which includes the further steps of comparing the first signal representing a probability density function estimation value to a second threshold value signal in the decision logic circuit; and denoting a storage register circuit and assigning the current unassigned input pulse parameter data from the switching circuit to the storage register circuit when the first signal, representing the probability density function estimation value, is less than the first threshold value and greater than the second threshold value signal.

5. A method as defined by claim 4, which includes the further step of manually setting the level of at least one of the first and second threshold value signals.

6. A method as defined by claim 4, wherein the first threshold value signal is greater in magnitude than the second threshold value signal.

* * * * *